US011099980B2

(12) United States Patent
Hetzler et al.

(10) Patent No.: US 11,099,980 B2
(45) Date of Patent: Aug. 24, 2021

(54) HOST AWARE UPDATE WRITE

(71) Applicant: International Business Machines Corporation, Armonk, NY (US)

(72) Inventors: Steven R. Hetzler, Los Altos, CA (US); Robert M. Rees, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 52 days.

(21) Appl. No.: 15/975,584

(22) Filed: May 9, 2018

(65) Prior Publication Data

US 2019/0347191 A1   Nov. 14, 2019

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/064* (2013.01); *G06F 3/0619* (2013.01);
(Continued)

(58) Field of Classification Search
CPC .... G06F 12/0246; G06F 3/0619; G06F 3/064; G06F 3/0656; G06F 3/0659; G06F 3/0679; G06F 2212/7201
See application file for complete search history.

(56) References Cited

U.S. PATENT DOCUMENTS 7,487,308 B1 * 2/2009 Dalal ................ G06F 3/0607
711/100
9,671,971 B2   6/2017 Trika et al.
(Continued)

FOREIGN PATENT DOCUMENTS

CN   101976182 A   2/2011
WO   2009028828 A2   3/2009

OTHER PUBLICATIONS

Choi, H. J., et al., "JFTL: A Flash Translation Layer Based on a Journal Remapping for Flash Memory," ACM Trans. on Storage, Jan. 2009, 22 pages, vol. 4, No. 4, ACM, United States.
(Continued)

*Primary Examiner* — Gurtej Bansal
(74) *Attorney, Agent, or Firm* — Sherman IP LLP; Kenneth L. Sherman; Steven Laut

(57) ABSTRACT

One embodiment provides a method comprising maintaining, on a storage unit, mapping data between a first set of logical addresses (e.g., logical block addresses or LBAs) viewed by a host and a first set of physical addresses (e.g., physical block addresses or PBAs) and a second set of physical addresses of the storage unit. A first logical address (e.g., LBA) of the first set of logical addresses corresponds to a first physical address (e.g., PBA) of the first set of physical addresses that maintains current data for the first logical address. The first logical address further corresponds to a second physical address (e.g., PBA) of the second set of physical addresses that maintains prior data for the first logical address. The method further comprises receiving, at the storage unit, a command from the host to perform a multi-device operation involving the first logical address. The operation is performed atomically.

20 Claims, 6 Drawing Sheets

(52) U.S. Cl.
CPC .......... *G06F 3/0656* (2013.01); *G06F 3/0659* (2013.01); *G06F 3/0679* (2013.01); *G06F 2212/7201* (2013.01)

(56) References Cited

U.S. PATENT DOCUMENTS

| | | |
|---|---|---|
| 2003/0177330 A1 | 9/2003 | Idei |
| 2005/0223185 A1 | 10/2005 | Lee |
| 2017/0024324 A1* | 1/2017 | Shu ..................... G06F 3/0604 |
| 2017/0160933 A1 | 6/2017 | De Jong et al. |

OTHER PUBLICATIONS

International Search Report and Written Opinion dated Jun. 18, 2019 for International Application PCT/!B2019/053419 from National Intelluctual Property Administration, PRC, pp. 1-9, Beijing, China.

United Kingdom Examination Report dated Feb. 16, 2021 for UK Patent Application No. GB2019203.5 from Intellectual Property Office (IPO), pp. 1-3, South Wales, United Kingdom.

Response to United Kingdom Examination Report filed Mar. 2, 2021 for UK Patent Application No. GB2019203.5 submitted to the UK Intellectual Property Office (IPO), pp. 1-3, Sevenoaks, United Kingdom.

United Kingdom Examination Report dated Jan. 7, 2021 for UK Patent Application No. GB2019203.5 from Intellectual Property Office (IPO), pp. 1-3, South Wales, United Kingdom.

Response to United Kingdom Examination Report filed Jan. 21, 2021 for UK Patent Application No. GB2019203.5 submitted to the UK Intellectual Property Office (IPO), pp. 1-3, Sevenoaks, United Kingdom.

* cited by examiner

HOST AWARE UPDATE WRITE

The present invention generally relates to storage systems, and more particularly, to a system and method for implementing a host aware update write protocol.

BACKGROUND

Hardware-based storage systems typically provide separate non-volatile storage for data protection against unintended power loss. A typical use for this separate non-volatile storage is the implementation of a write-ahead log, which guarantees that missing updates can be applied for the atomic read-modify-write operations that are associated with erasure coding. By comparison, software-defined storage systems that implement erasure coding for data protection cannot assume presence of non-volatile storage, and are therefore forced to implement these write-ahead logs using additional storage devices, which increases the I/O load at the system level, leading to reduced throughput and increased response time.

SUMMARY

One embodiment provides a method comprising maintaining, on a storage unit, mapping data between a first set of logical addresses (e.g., logical block addresses or LBAs) viewed by a host and a first set of physical addresses (e.g., physical block addresses or PBAs) and a second set of physical addresses of the storage unit. A first logical address (e.g., LBA) of the first set of logical addresses corresponds to a first physical address (e.g., PBA) of the first set of physical addresses that maintains current data for the first logical address. The first logical address further corresponds to a second physical address (e.g., PBA) of the second set of physical addresses that maintains prior data for the first logical address. The method further comprises receiving, at the storage unit, a command from the host to perform a multi-device operation involving the first logical address. The operation is performed atomically.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to storage systems, and more particularly, to a system and method for implementing a host aware update write protocol. One embodiment provides a method comprising maintaining, on a storage unit, mapping data between a first set of logical addresses (e.g., logical block addresses or LBAs) viewed by a host and a first set of physical addresses (e.g., physical block addresses or PBAs) and a second set of physical addresses of the storage unit. A first logical address (e.g., LBA) of the first set of logical addresses corresponds to a first physical address (e.g., PBA) of the first set of physical addresses that maintains current data for the first logical address. The first logical address further corresponds to a second physical address (e.g., PBA) of the second set of physical addresses that maintains prior data for the first logical address. The method further comprises receiving, at the storage unit, a command from the host to perform a multi-device operation involving the first logical address. The operation is performed atomically.

For expository purposes, the term "erasure-coded storage system" as used herein generally refers to a storage system that implements a general class of algorithms for data resiliency, such as, but not limited to, storage systems that implement any level of Redundant Array of Independent Disks (RAID).

Conventional software-defined storage systems that implement erasure coding for data protection cannot assume presence of non-volatile storage. FIGS. 1A-1F illustrates an example sequence of steps for performing an update write operation on a conventional software-defined erasure-coded storage system 10.

Figure 1A:
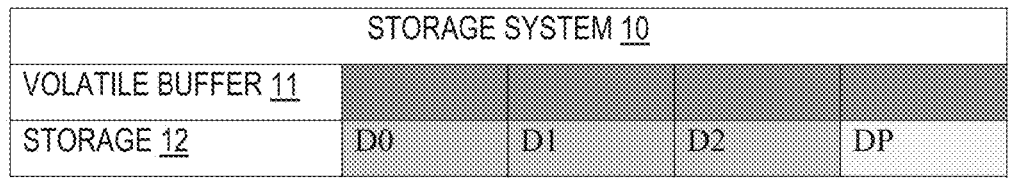
FIG. 1A illustrates a conventional software-defined erasure-coded storage system in an initial state at time $t_0$.

FIG. 1A illustrates the storage system 10 in an initial state at time $t_0$. The storage system 10 implements a 3+P erasure code for data protection. The storage system 10 comprises one or more non-volatile storage units 12 for maintaining data (e.g., data blocks and parity blocks). The storage system 10 further comprises a volatile buffer 11 for holding data during input/output (I/O) operations on the one or more storage units 12. As shown in FIG. 1A, in the initial state, the one or more storage units 12 maintain data block D0, data block D1, data block D2 and a parity block DP computed in accordance with parity equation (1) provided below:

$$DP = D0 + D1 + D2 \qquad (1),$$

wherein + denotes an Exclusive OR (XOR) operation.

A parity stripe comprises a set of data blocks and one or more parity blocks corresponding to the set of data blocks. For example, data blocks D0-D2 and parity block DP together form a parity stripe.

Figure 1B:
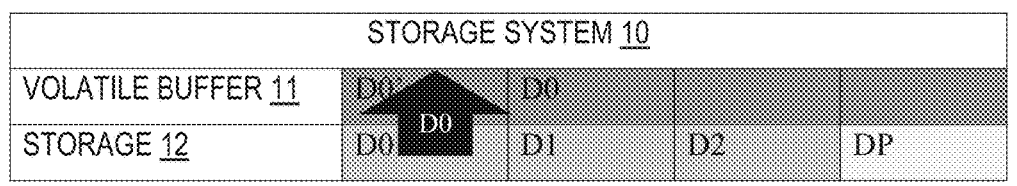
FIG. 1B illustrates the storage system at time $t_1$.

FIG. 1B illustrates the storage system 10 at time $t_1$. Assume the update write operation is a multi-device operation issued by an external host system and requiring an update write of data block D0 in the one or more storage units 12 with new data block D0'. At time $t_1$, in response to receiving the update write operation from the external host system, the storage system 10 reads data block D0 from the one or more storage units 12 into the volatile buffer 11.

Figure 1C:
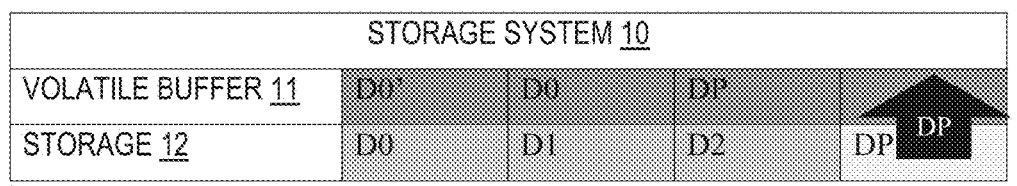
FIG. 1C illustrates the storage system at time $t_2$.

FIG. 1C illustrates the storage system 10 at time $t_2$. To successfully complete the update write operation, parity block DP must also be updated to new parity block DP'. At time t2, the storage system 10 reads parity block DP from the one or more storage units 12 into the volatile buffer 110.

Figure 1D:
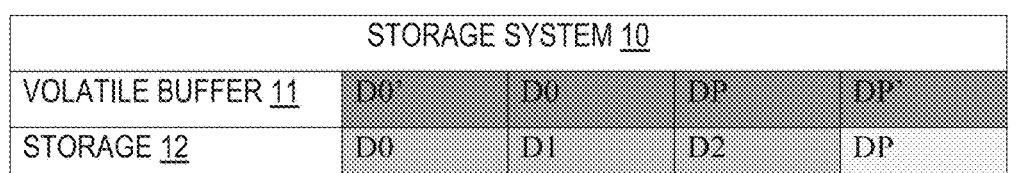
FIG. 1D illustrates the storage system at time $t_3$.

FIG. 1D illustrates the storage system 10 at time $t_3$. At time $t_3$, the storage system 10 computes new parity block DP' in accordance with parity equation (2) provided below:

$$DP'=D0+D0'+DP \qquad (2).$$

Figure 1E:
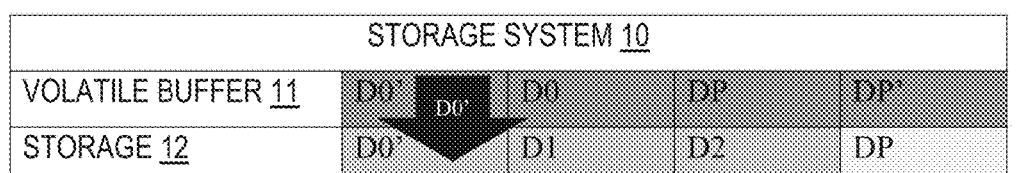
FIG. 1E illustrates the storage system at time $t_4$.

FIG. 1E illustrates the storage system 10 at time $t_4$. At time $t_4$, the storage system 10 writes new data block D0' into the one or more storage units 120.

Figure 1F:
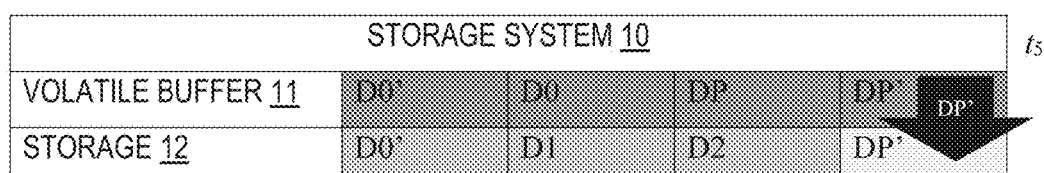
FIG. 1F illustrates the storage system at time $t_5$.

FIG. 1F illustrates the storage system 10 at time $t_5$. At time $t_5$, the storage system 10 writes new parity block DP' into the one or more storage units 120 to complete the update write operation.

The steps involving data block D0 and parity strip DP are asynchronous, so the sequence of steps illustrated in FIGS. 1A-1F is one possible ordering.

If an unintended power loss event occurs between time $t_4$ and time $t_5$, a data integrity exposure results. Specifically, parity block DP may be compromised, resulting in an indeterminate parity state that the storage system 10 cannot recover from. The indeterminate parity state for parity block DP may be expressed in accordance with expression (3) provided below:

$$DP!=D0'+D1+D2 \qquad (3).$$

If the external host system re-tried the update write operation, the storage system 10 would provide an invalid new parity block DP' as the storage system 10 would compute new parity block DP' in accordance with parity equation (4) provided below:

$$DP'=D0'+D0'+DP \qquad (4),$$

wherein parity equation (4) is simplified to parity equation (5) provided below, due to the properties of the XOR operation:

$$DP'=DP \qquad (5).$$

If the steps performed at times $t_4$ and $t_5$ were reversed, similar data integrity exposures result in the event of a power loss. Further, there is a greater potential for data integrity exposures if a parity block is expressed using a more complex parity equation. As such, there is a need to harden an update write operation and for this multi-device operation to be atomic.

It is desirable for software-defined systems to exhibit properties necessary for recovering from events such as power loss, like atomicity and other properties associated with durability. For example, if an unintended power loss occurs during an update write operation, a software-defined storage system must be able to recover to a consistent state of storage and ensure correct erasure code.

In a conventional software-defined storage system without a non-volatile buffer, logs are used to implement atomicity for data updates. Logs are typically stored in additional non-volatile storage units of storage system. Replication may be implemented for data protection of the logs to avoid data integrity exposures that result in the event of a power loss.

One conventional method for implementing atomicity for data updates is write-ahead logging (i.e., shadow logging) which involves using a write-ahead transaction log when updating a parity block. Write-ahead logging incurs a high I/O amplification penalty.

For example, let d1', d2', . . . , dN' denote a set of N logical addresses (e.g., logical block addresses or LBAs) for new data blocks that require an atomic update write (i.e., update write atomically across the non-volatile storage units). Let p1', p2', . . . , pM' denote a set of MLBAs for new parity blocks that correspond to the N LBAs and that also require an atomic update write. Let d1, d2, . . . , dN and p1, p2, . . . , pM denote prior versions of the N LBAs and the M LBAs, respectively.

To update write a parity block, read operations involving reading the prior versions of the N LBAs and the M LBAs (i.e., d1, d2,. . . , dN and p1, p2, . . . , pM) from the non-volatile storage units are required so that the M LBAs may be computed from the N LBAs using a parity equation. These read operations require N+M block reads.

To achieve atomicity for the update writes, a multi-block log record is written prior to writing new data blocks and new parity blocks to the non-volatile storage units. The log record comprises the new data blocks and the new parity blocks (i.e., d2', . . . , dN' and p1', p2', . . . , pM'). The log record may include the new data and parity values in-line as part of the log record itself or include pointers to blocks allocated from an implementation-managed shadow block area. In either case, N+M block writes to the log record and/or the shadow block area are required. Further, C mirror copies of the log record are required to protect the log record itself from data loss, wherein C is a value selected to match the fault tolerance of an erasure code implemented by the storage system. As a result, write-ahead logging results in a write amplification factor of C(N+M) writes.

Only when the new data blocks and parity blocks are safely written to the log record then the new data blocks and parity blocks can be written to the non-volatile storage units. Therefore, the total I/O amplification factor for the atomic update writes using write-ahead logging is the sum of N30 M block reads and C(N+M) writes.

As data blocks and parity blocks are not synchronized, a parity block may be compromised (i.e., indeterminate parity state).

One embodiment provides a system and method for write reduction (i.e., reducing write I/O burden) on storage systems using shadow logs in conjunction with a write-ahead transaction log to maintain data integrity through atomicity when underlying storage uses a copy-on-write (COW) methodology. Without such data protection, a data integrity exposure may occur if there is an unintended power loss. One embodiment applies to flash storage and COW file systems such as ZFS. One embodiment avoids additional write operations that are typically required to provide resiliency for shadow copies and write-ahead transaction logs.

A COW storage unit, such as flash, has an internal translation layer that maintains metadata information for mapping ("mapping data") a set of logical addresses (e.g., LBAs) seen by an external host system to a set of physical addresses (e.g., physical block addresses or PBAs) of the storage unit. As flash storage generally does not support update-in-place for write operations, maintaining the mapping data internally allows the storage unit to support garbage collection of full erase blocks.

Figure 2A:
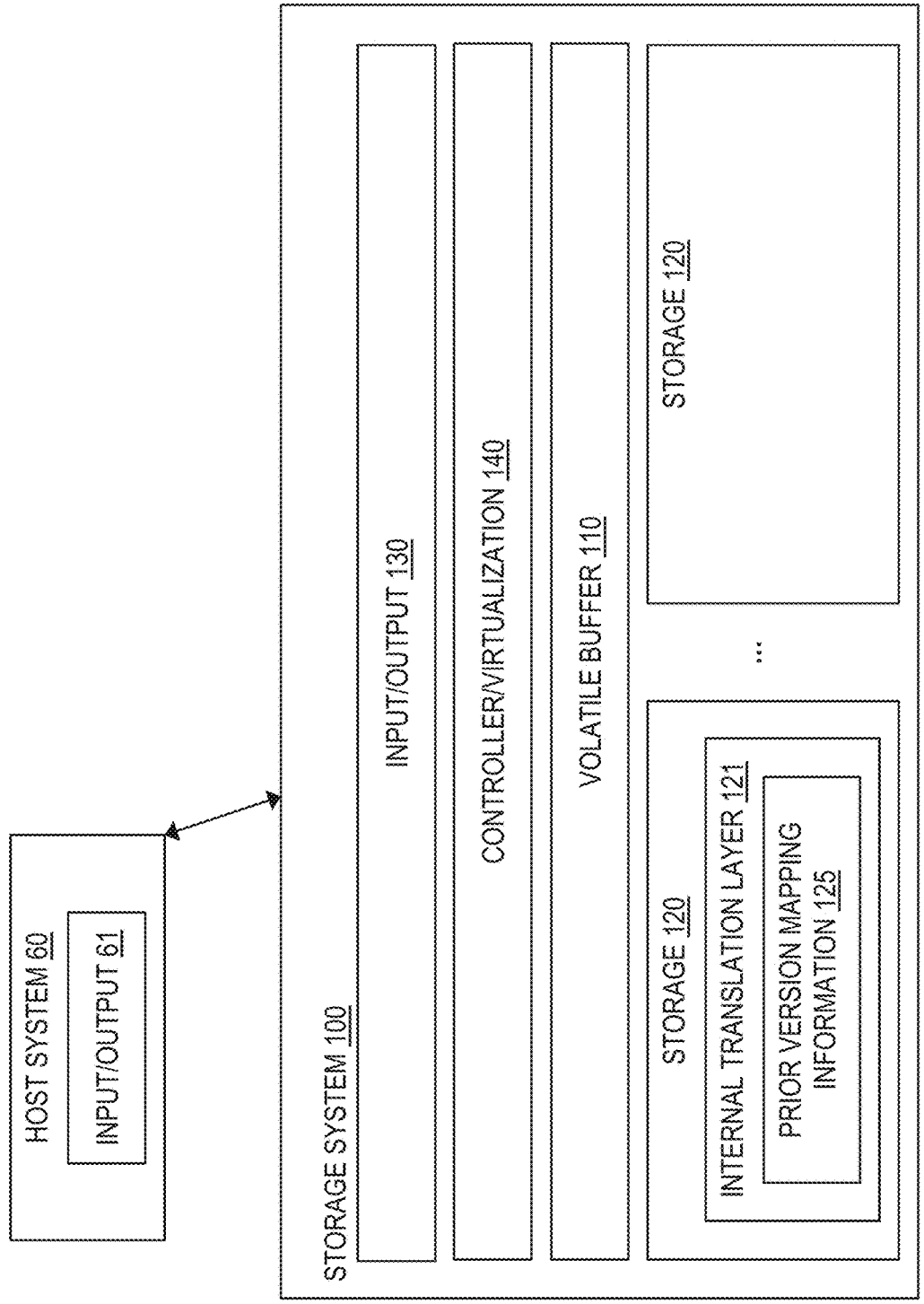
FIG. 2A illustrates an example framework for storage, in one or more embodiments.

FIG. 2A illustrates an example framework 50 for storage, in one or more embodiments. The example framework 50 comprises a software-defined storage system 100 and an external host system 60 connected to the storage system 100.

In one embodiment, the storage system 100 is a storage array comprising one or more non-volatile storage units 120 (e.g., COW storage units) for maintaining data (e.g., data blocks and parity blocks). The storage system 100 further comprises an I/O unit 130 configured to exchange data with the host system 60, such as receiving commands (e.g., read commands, write commands, etc.). The storage system 100 further comprises a volatile buffer 110 for holding data during I/O operations performed on the one or more storage units 120 in response to the commands received. In one embodiment, the storage system 100 implements an erasure code for data protection (i.e., an erasure-coded storage system).

In one embodiment, the host system 60 views data stored on the one or more storage units 120 as a virtualized address space of LBAs, without knowledge of boundaries of the one or more storage units 120 or particulars of the erasure code implemented by the storage system 100. The host system 60 comprises an I/O unit 61 configured to exchange data with the storage system 100, such as issuing commands (e.g., read commands, write commands, etc.). The host system 60 may issue commands to the virtualized address space without being aware that write commands may involve additional update write operations to keep the erasure code intact.

Figure 2B:
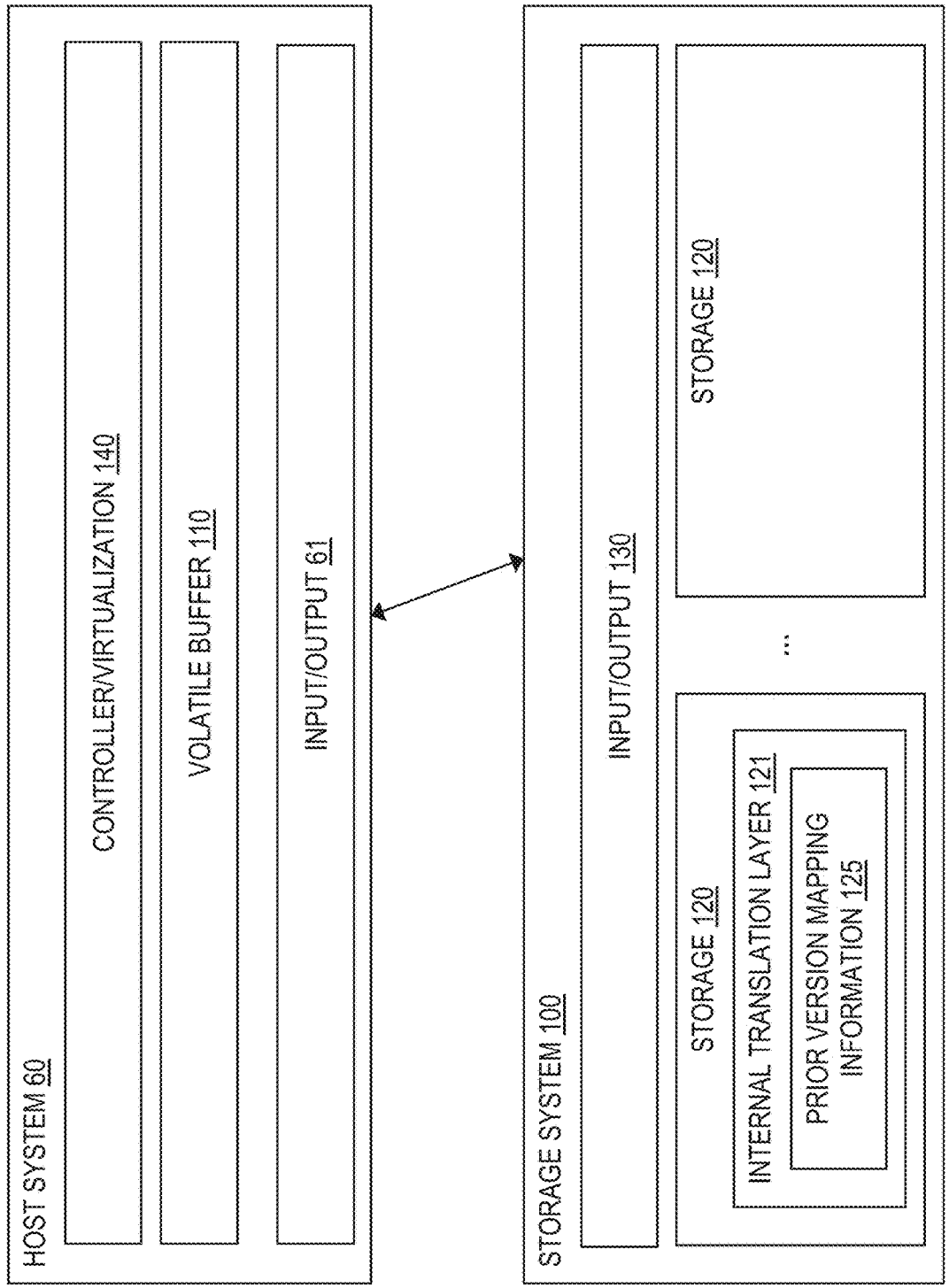
FIG. 2B illustrates another example framework for storage, in one or more embodiments.
Figure 2C:
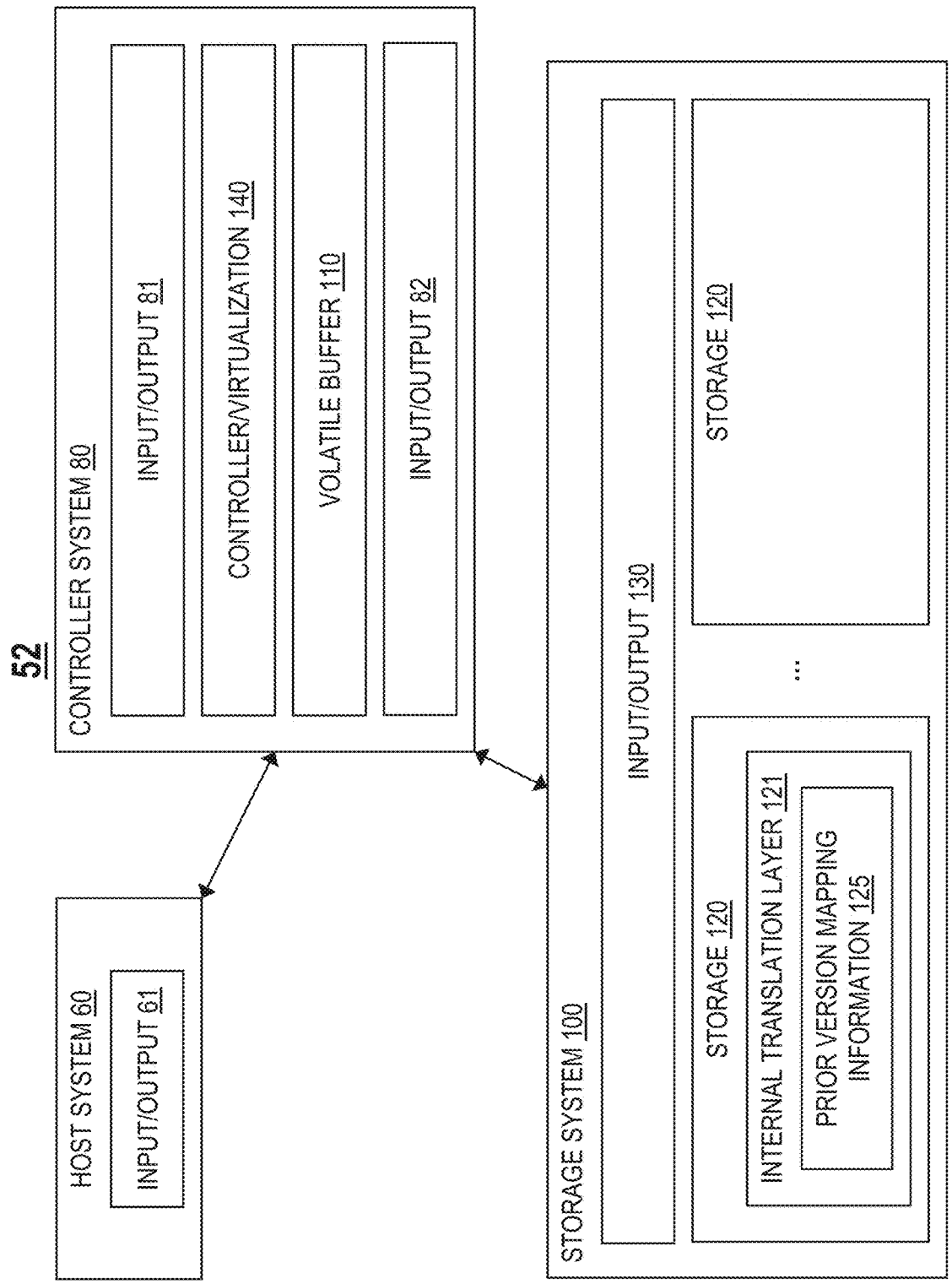
FIG. 2C illustrates yet another example framework for storage, in one or more embodiments.

In one embodiment, the storage system 100 further comprises a controller/virtualization unit 140 configured to identify, for an LBA of the virtualized address space seen by the host system 60, one or more portions of the one or more storage units 120 that contain data blocks and parity blocks corresponding to the LBA. The controller/virtualization unit 140 maps logical addresses of the virtualized address space to physical addresses of the one or more storage units 120 (e.g., mapping a LBA of the virtualized address space to PBAs of the one or more storage units 120 containing corresponding data blocks and parity blocks). In another embodiment, the controller/virtualization unit 140 is implemented on the host system 60 instead (as shown in FIG. 2B). In yet another embodiment, the controller/virtualization unit 140 is implemented on another external system, such as a controller system 80 (as shown in FIG. 2C).

Compared to conventional software-defined storage systems, the framework 50 supports modifications to a behavior of the storage system 100 and modifications to an I/O interface with the host system 60 to achieve a reduction in the number of additional write operations required. Specifically, the framework 50 extends mapping metadata maintained in an internal translation layer 121 of at least one storage unit 120. The extended mapping metadata comprises, but is not limited to, prior version mapping information 125 identifying and tracking one or more prior version copies of one or more LBAs (i.e., LBAs for data blocks or parity blocks). The framework 50 further provides one or more new I/O interfaces implemented by the controller/virtualization unit 140 and the one or more storage units 120 to facilitate processing and management of prior version mapping information.

An internal translation layer 121 of a storage unit 120 is configured to implement the following functions: (1) a function for determining a PBA of the storage unit 120 associated with a LBA, and (2) a function for retrieving a free PBA of the storage unit 120 for a write operation.

The framework 50 supports both a host-aware model where a majority of functions is performed in storage and a host-managed approach where necessary information for providing a new function is available and actionable at a host level.

In one embodiment, unlike conventional software-defined storage systems, a LBA may correspond to a plurality of PBAs. For example, a LBA may correspond to a first PBA maintaining a data block and a second PBA maintaining a prior version copy of the data block. While an embodiment of prior version mapping information described in detail later herein identifies and tracks a single prior version copy of one or more LBAs, prior version mapping information may identify and track a plurality of prior version copies of one or more LBAs.

Prior version mapping information may be stored on at least one storage unit 120 in a plurality of ways such as, but not limited to, hash tables, key-values stores, databases, etc. As a total number of prior version copies is expected to be significantly smaller than a total number of LBAs available, prior version copies may be stored separately in one embodiment, for example using a sparse data structure, for efficient storage, thereby removing the requirement of having an entry in prior version mapping information for a prior version copy of each LBA.

In one embodiment, management of prior version mapping information on a storage unit 120 is implemented by including, for a LBA, a first pointer to a first PBA maintaining a current version copy of data (i.e., a current data block or a current parity block) for the LBA, and a second pointer to a second PBA maintaining a prior version copy of data for the LBA (i.e., a prior data block or a prior parity block). As described in detail later herein, maintaining prior version mapping information on at least one storage unit 120 facilitates tracking state of internal operations of the at least one storage unit 120 for data recovery following a power loss event.

Table 1 below provides an example entry for a LBA, wherein the entry is included in prior version mapping information on a storage unit 120, in one or more embodiments.

| Field | Description |
| --- | --- |
| ID | Identifier of the entry |
| LBA | LBA seen by the host system 60 |
| Current PBA | PBA of the storage unit 120 that contains a current version copy of data for the LBA |
| Prior PBA | PBA of the storage unit 120 that contains a prior version copy of data for the LBA |
| gwc | Global write complete flag |
| tsn | Transaction sequence number |
| hmd | Host-defined metadata |

As shown in Table 1 provided above, the entry comprises a plurality of fields. The plurality of fields include, but are not limited to, one or more of the following: (1) an optional ID field containing a local identifier for the entry (e.g., an address in the storage array) for use in internal management of the entry, (2) a LBA field containing a LBA of the virtualized address space seen/viewed by the host system 60, (3) a Current PBA field containing a PBA of the storage unit 120 that contains a current version copy of data for the LBA, (4) a Prior PBA field containing a different PBA of the storage unit 120 that contains a prior version copy of data for the LBA, (5) a global write complete (gwc) field containing a gwc flag indicative of whether a write operation is complete, (6) a transaction sequence number (tsn) field containing a tsn that is unique across all entries included in the prior version mapping information on the storage unit 120, and (7) a host-defined metadata (hmd) field containing hmd.

If the entry is empty, the LBA field may maintain a NULL value instead to mark the entry as empty. If a current version copy of data for the LBA is not assigned, the Current PBA field may maintain a NULL value instead. If a prior version copy of data for the LBA is not assigned, the Prior PBA field may maintain a NULL value instead.

For expository purposes, let the term "data unit" generally refer to a portion of a storage unit 120 that includes one or more PBAs containing one or more data blocks. Let the term "parity unit" generally refer to a portion of a storage unit 120 that includes one or more PBAs containing one or more parity blocks. Let the term "affected data unit" generally refer to a data unit containing a data block that requires an update write to successfully complete an outstanding command. Let the term "affected parity unit" generally refer to a parity unit containing a parity block that requires an update write to successfully complete an outstanding command.

In one embodiment, hmd identifies one or more LBAs for one or more data blocks involved in an outstanding update write operation, and one or more affected data units containing the one or more data blocks. In another embodiment, hmd can be used to store other host-specific information related to the write operation.

In one embodiment, a LBA for data which is not part of an outstanding update write operation need not have an entry in prior version mapping information on a storage unit 120.

Maintaining prior version mapping information on at least one storage unit 120 ensures atomic write operations to the storage system 100.

In one embodiment, the storage system 100 implements a single parity erasure code. In another embodiment, the storage system 100 implements erasure codes with more complex parity equations/arrangements.

FIG. 2B illustrates another example framework 51 for storage, in one or more embodiments. In the framework 51, the controller/virtualization unit 140 and the volatile buffer 110 are implemented on the host system 60 instead.

Similar to the framework 50 described above, the framework 51 supports modifications to a behavior of the storage system 100 and modifications to an I/O interface with the host system 60 to achieve a reduction in the number of additional write operations required. The framework 51 provides one or more new I/O interfaces implemented by the controller/virtualization unit 140 and the one or more storage units 120 via the I/O units 61 and 130, respectively, to facilitate processing and management of prior version mapping information. The framework 51 supports both a host-aware model where a majority of functions is performed in storage and a host-managed approach where necessary information for providing a new function is available and actionable at a host level.

FIG. 2C illustrates another example framework 52 for storage, in one or more embodiments. In the framework 52, the controller/virtualization unit 140 and the volatile buffer 110 are implemented on another external system instead, such as a controller system 80. The controller system 80 further comprises a first I/O unit 81 configured to exchange data with the host system 60, and a second I/O unit 82 configured to exchange data with the storage system 100.

Similar to the framework 50 described above, the framework 52 supports modifications to a behavior of the storage system 100 and modifications to an I/O interface with the host system 60 to achieve a reduction in the number of additional write operations required. The framework 52 provides one or more new I/O interfaces implemented by the controller/virtualization unit 140 and the one or more storage units 120 via the I/O units 82 and 130, respectively, to facilitate processing and management of prior version mapping information. The framework 52 supports both a host-aware model where a majority of functions is performed in storage and a host-managed approach where necessary information for providing a new function is available and actionable at a host level.

Figure 3:
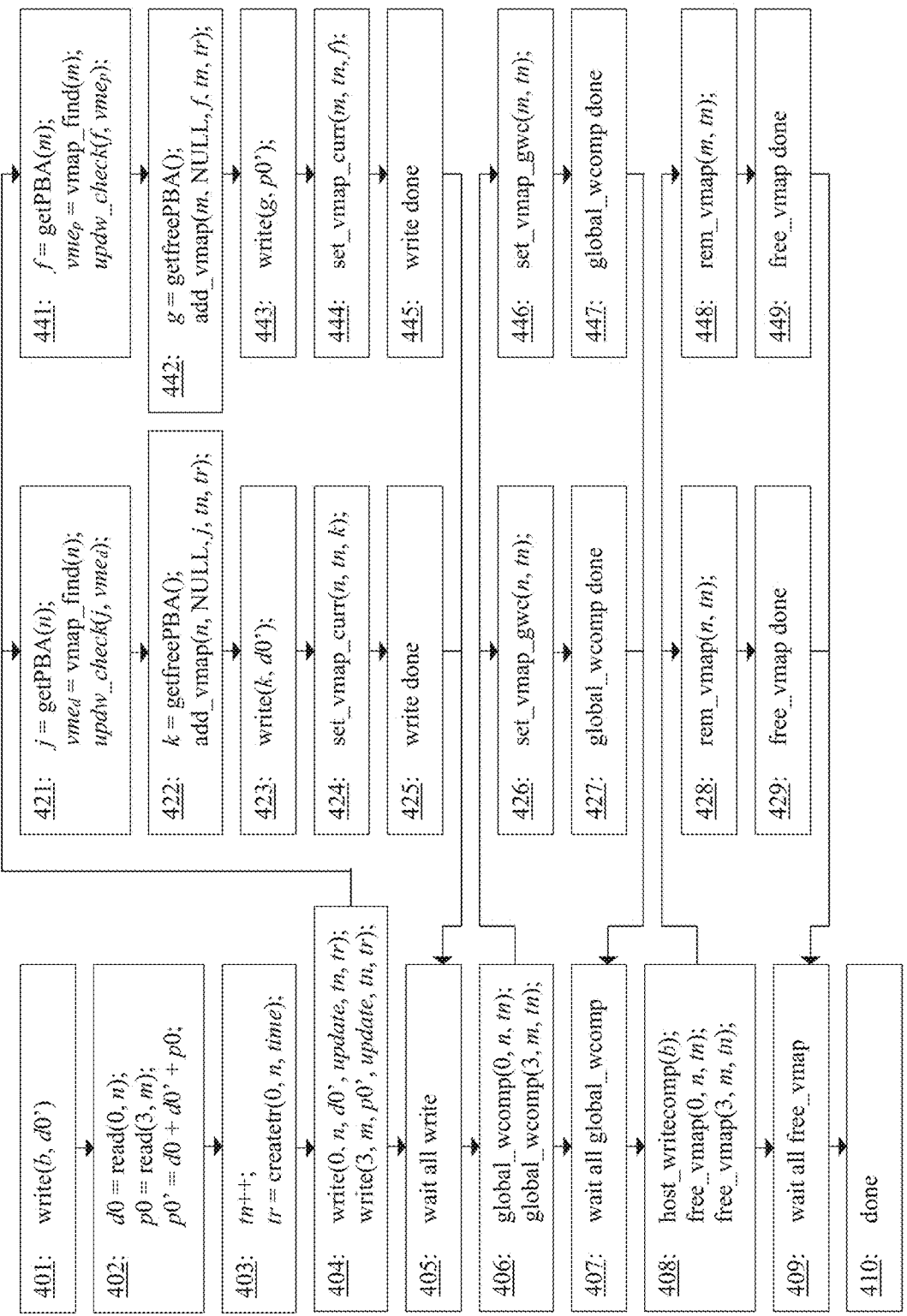
FIG. 3 is a flowchart illustrating an example process for implementing a host aware update protocol to keep a single parity erasure code intact, in one or more embodiments.

FIG. 3 is a flowchart illustrating an example process 400 for implementing a host aware update protocol to keep the single parity erasure code intact, in one or more embodiments. Process block 401 includes the host system 60 issuing a write command to the virtualized address space. For example, assume the host system 60 issues a write command (e.g., write(b, d0')) to write new data block d0' to LBA b of the virtualized address space. In one embodiment, the write command may refer to a range of contiguous LBAs.

Process block 402 includes the controller/virtualization unit 140 identifying each affected data unit and each affected parity unit requiring an update write to successfully complete the write command, and each LBA corresponding to each affected data unit and each affected parity unit. In process block 402, the controller/virtualization unit 140 identifies that an update write operation is required to successfully complete the write command.

For example, assume the controller/virtualization unit 140 identifies that an affected data unit is data unit 0 with corresponding LBA n and an affected parity unit is parity unit 3 with a corresponding LBA m. The controller/virtualization unit 140 issues a read command (e.g., read(0, n)) on data unit 0 with corresponding LBA n to retrieve current data block d0 (i.e., a current version copy), and another read command (e.g., read(3, m)) on parity unit 3 with corresponding LBA m to retrieve current parity block p0 (i.e., a current version copy). The controller/virtualization unit 140 then computes new parity block p0', wherein p0'=d0+d0'+p0.

Process block 403 includes the controller/virtualization unit 140 incrementing a current transaction sequence number tn. The transaction sequence number tn corresponds to the outstanding update write operation. Process block 403 further includes the controller/virtualization unit 140 creating a transaction record tr. The transaction record tr comprises a list of each affected data unit, each LBA corresponding to each affected data unit, and optionally a timestamp. For example, assume the controller/virtualization unit 140 creates a transaction record tr comprising data unit 0, LBA n and timestamp time (e.g., createtr(0, n, time)).

Process block 404 includes the controller/virtualization unit 140 initiating an update write operation on each affected data unit and each affected parity unit requiring an update write to successfully completing the write command. For example, assume the controller/virtualization unit 140 initiates an update write operation on each of the following: data unit 0 with corresponding LBA n to write new data block d0' (e.g., write(0, n, d0', update, tn, tr)), and parity unit 3 with corresponding LBA m to write new parity block p0' (e.g., write(3, m, p0', update, tn, tr)). The controller/virtualization unit 140 issues a write command to each affected data unit and each affected parity unit in parallel. Each write command issued includes the following parameters: an update write flag update set to indicate that the write command is an update write operation, transaction sequence number tn and transaction record tr.

After the controller/virtualization unit 140 issues a write command to each affected data unit and each affected parity unit, the controller/virtualization unit 140 proceeds to process block 405 to wait for a write complete notification from each affected data unit and each affected parity unit. While the controller/virtualization unit 140 waits in process block 405, data unit 0 performs steps of process blocks 421-425, and parity unit 3 performs steps of process blocks 441-445. The steps of process blocks 421-425 are asynchronous to the steps of process blocks 441-445 (i.e., the completion of process blocks 425 and 445 can occur in any order).

Process block 421 includes data unit 0 determining, in response to receiving a write command from the controller/virtualization unit 140, a PBA of data unit 0 that corresponds to LBA n (e.g., getPBA(n)). For example, assume data unit 0 determines, via its internal translation layer, that PBA j corresponds to LBA n. Process block 421 further includes data unit 0 performing a lookup search of its prior version mapping information (maintained in its internal translation layer) to retrieve an entry $vme_d$ for LBA n (e.g., vmap_find (n)). The entry $vme_d$ identifies and tracks a prior version copy for LBA n. If the lookup search is successful, the entry $vme_d$ is returned. Process block 421 further includes determining whether a state of PBA j and the entry $vme_d$ are valid for an update write (e.g., updw_check(j, $vme_d$)). If neither the state of PBA j nor the entry $vme_d$ are valid for an update write, an error recovery process may be invoked. If the state of PBA j and the entry $vme_d$ are valid for an update write, data unit 0 proceeds to process block 422.

Process block 422 includes data unit 0 retrieving a free PBA k of data unit 0 to use as a target PBA to write new data block d0' (e.g., getfreePBA( ). An error recovery process may be invoked if data unit 0 is unable to retrieve a free PBA. Process block 422 further includes data unit 0 adding a new entry for LBA n to its prior version mapping information (e.g., add vmap(n, NULL, j, tn, tr)). For example, the new entry comprises the following fields with the following assigned values: (1) the Current PBA field assigned the NULL value, (2) the Prior PBA field assigned j, (3) the tsn field assigned tn, (4) the hmd field assigned tr, and (5) the gwc field cleared (i.e., not set). Adding the new entry saves both the current data block d0 stored in PBA j and associated with LBA n from being erased or re-used, thereby making it available for data recovery operations (e.g., in the event of a power loss). As no data blocks are written, adding the new entry incurs only a small atomic table update.

Process block 423 includes data unit 0 writing new data block d0' to free PBA k (e.g., write(k, d0')).

Process block 424 includes data unit 0 updating an entry in its prior version mapping information that corresponds to LBA n and includes transaction sequence number tn by assigning k to the Current PBA field of the entry (e.g., set_vmap_curr(n, tn, k)). This update is an atomic table update that occurs only after new data block d0' is written to PBA k.

Process block 425 includes data unit 0 issuing a write complete notification to the controller/virtualization unit 140, confirming that the write command it received from the controller/virtualization unit 140 is complete.

Process block 441 includes parity unit 3 determining, in response to receiving a write command from the controller/virtualization unit 140, a PBA of parity unit 3 that corresponds to LBA m (e.g., getPBA(m)). For example, assume parity unit 3 determines, via its internal translation layer, that PBA f corresponds to LBA m. Process block 441 further includes parity unit 3 performing a lookup search of its prior version mapping information (maintained in its internal translation layer) to retrieve an entry $vme_p$ for LBA m (e.g., vmap_find(m)). The entry $vme_p$ identifies and tracks a prior version copy for LBA m. If the lookup search is successful, the entry $vme_p$ is returned. Process block 441 further includes determining whether a state of PBA f and the entry $vme_p$ are valid for an update write (e.g., updw_check(f, $vme_p$)). If neither the state of PBA f nor the entry $vme_p$ are valid for an update write, an error recovery process may be invoked. If the state of PBA f and the entry $vme_p$ are valid for an update write, parity unit 3 proceeds to process block 442.

Process block 442 includes parity unit 3 retrieving a free PBA g of parity unit 3 to use as a target PBA to write new parity block p0' (e.g., getfreePBA( ). An error recovery process may be invoked if parity unit 3 is unable to retrieve a free PBA. Process block 442 further includes parity unit 3 adding a new entry for LBA m to its prior version mapping information (e.g., add_vmap(m, NULL, f, tn, tr)). For example, the new entry comprises the following fields with the following assigned values: (1) the Current PBA field assigned the NULL value, (2) the Prior PBA field assigned f, (3) the tsn field assigned tn, (4) the hmd field assigned tr, and (5) the gwc field cleared (i.e., not set). Adding the new entry saves both the current parity block p0 stored in PBA f and associated with LBA m from being erased or re-used, thereby making it available for data recovery operations (e.g., in the event of a power loss). As no data blocks are written, adding the new entry incurs only a small atomic table update.

Process block 443 includes parity unit 3 writing new parity block p0' to free PBA g (e.g., write(g, p0')).

Process block 444 includes parity unit 3 updating an entry in its prior version mapping information that corresponds to LBA m and includes transaction sequence number to by assigning g to the Current PBA field of the entry (e.g., set_vmap_curr(m, tn, f)). This update is an atomic table update that occurs only after new parity block p0' is written to PBA g.

Process block 445 includes parity unit 3 issuing a write complete notification to the controller/virtualization unit 140, confirming that the write command it received from the controller/virtualization unit 140 is complete.

Process block 405 includes the controller/virtualization unit 140 implementing a barrier synchronization ("barrier sync") operation by waiting for write complete notifications from data unit 0 and parity unit 3, confirming that the outstanding write commands issued to data unit 0 and parity unit 3 are complete. In one embodiment, an additional write command to an affected unit (i.e., an affected data unit or an affected parity unit) is blocked until the controller/virtualization unit 140 receives a write complete notification from the affected unit. In one embodiment, if prior version mapping information maintained on an affected unit identifies and tracks a plurality of prior version copies for a LBA, additional write commands to the affected blocks (i.e., data blocks and parity blocks) of an affected parity stripe are blocked once a limit on the total number of prior version copies is reached.

Process block 406 includes the controller/virtualization unit 140 issuing, in response to receiving a write complete notification from each affected unit, a global write complete command to each affected unit. For example, assume the controller/virtualization unit 140 issues a global write complete command to each of the following affected units: data unit 0 with corresponding LBA n (e.g., global_wcomp(0, n, tn)), and parity unit 3 with corresponding LBA m (e.g., global_wcomp(3, m, tn)). Each global write command issued includes transaction sequence number tn as a parameter.

After the controller/virtualization unit 140 issues a global write command to each affected unit, the controller/virtualization unit 140 proceeds to process block 407 to wait for a global write complete notification from each affected unit. While the controller/virtualization unit 140 waits in process block 407, data unit 0 performs steps of process blocks 426-427, and parity unit 3 performs steps of process blocks 446-447. The steps of process blocks 426-427 are asynchronous to the steps of process blocks 446-447 (i.e., the completion of process blocks 427 and 447 can occur in any order).

Process block 426 includes data unit 0 updating, in response to receiving a global write command from the controller/virtualization unit 140, an entry in its prior version mapping information that corresponds to LBA n and includes transaction sequence number tn by setting the gwc flag of the entry (e.g., set_vmap_gwc(n, tn)). After setting the gwc flag, data unit 0 proceeds to process block 427.

Process block 427 includes data unit 0 issuing a global write complete notification to the controller/virtualization unit 140, confirming that the global write complete command it received from the controller/virtualization unit 140 is complete.

Process block 446 includes parity unit 3 updating, in response to receiving a global write command from the controller/virtualization unit 140, an entry in its prior version mapping information that corresponds to LBA m and includes transaction sequence number tn by setting the gwc flag of the entry (e.g., set_vmap_gwc(m, tn)). After setting the gwc flag, parity unit 3 proceeds to process block 447.

Process block 447 includes parity unit 3 issuing a global write complete notification to the controller/virtualization unit 140, confirming that the global write complete command it received from the controller/virtualization unit 140 is complete.

Process block 407 includes the controller/virtualization unit 140 waiting for global write complete notifications from data unit 0 and parity unit 3, confirming that the outstanding global write commands issued to data unit 0 and parity unit 3 are complete. In one embodiment, the controller/virtualization unit 140 implements a barrier sync operation during process block 407.

Process block 408 includes the controller/virtualization unit 140 issuing, in response to receiving a global write complete notification from each affected unit, a host write complete notification for LBA b of the virtualized address space to host system 60 (e.g., host_writecomp(b)). Process block 408 further includes the controller/virtualization unit 140 issuing a free command to each affected unit to free an entry in its prior version mapping information that corresponds to a LBA corresponding to the affected unit and includes transaction sequence number tn, so that the update write operation is hardened. For example, assume the controller/virtualization unit 140 issues a free command to each of the following affected units: data unit 0 with corresponding LBA n (e.g., free_vmap(0, n, tn)), and parity unit 3 with corresponding LBA m (e.g., free_vmap(3, m, tn)). Each free command issued includes transaction sequence number tn as a parameter.

After the controller/virtualization unit 140 issues a free command to each affected unit, the controller/virtualization unit 140 proceeds to process block 409 to wait for a free complete notification from each affected unit. While the controller/virtualization unit 140 waits in process block 409, data unit 0 performs steps of process blocks 428-429, and parity unit 3 performs steps of process blocks 448-449. The steps of process blocks 428-429 are asynchronous to the steps of process blocks 448-449 (i.e., the completion of process blocks 429 and 449 can occur in any order).

Process block 428 includes data unit 0 removing, in response to receiving a free command from the controller/virtualization unit 140, an entry in its prior version mapping information that corresponds to LBA n and includes transaction sequence number tn (e.g., rem_vmap(n, tn)).

Process block 449 includes data unit 0 issuing a free complete notification to the controller/virtualization unit 140, confirming that the free command it received from the controller/virtualization unit 140 is complete.

Process block 448 includes parity unit 3 removing, in response to receiving a free command from the controller/virtualization unit 140, an entry in its prior version mapping information that corresponds to LBA m and includes transaction sequence number tn (e.g., rem_vmap(m, tn)).

Process block 449 includes parity unit 3 issuing a free complete notification to the controller/virtualization unit 140, confirming that the free command it received from the controller/virtualization unit 140 is complete.

Process block 409 includes the controller/virtualization unit 140 waiting for free complete notifications from data unit 0 and parity unit 3, confirming that the outstanding free commands issued to data unit 0 and parity unit 3 are complete. In one embodiment, the controller/virtualization unit 140 implements a barrier sync operation during process block 409.

Process block 410 is the end of process 400.

A host aware update write protocol is implemented in a manner similar to the process 400 described above if the storage system 100 implements erasure codes with more complex parity equations/arrangements.

Table 2 below provides an entry in prior version mapping information on data unit 0 that corresponds to LBA n during some process blocks of process 400.

TABLE 2

| Process Block | Field | | | | | |
|---|---|---|---|---|---|---|
| | LBA | Current PBA | Prior PBA | gwc | tsn | hmd |
| 421 | — | — | — | — | — | — |
| 422 | n | NULL | j | 0 | tn | 0, n |
| 424 | n | k | j | 0 | tn | 0, n |
| 405 | | | Barrier sync | | | |
| 426 | n | k | j | 1 | tn | 0, n |
| 428 | — | — | — | — | — | — |

Table 3 below provides an entry in prior version mapping information on parity unit 3 that corresponds to LBA m during some process blocks of process 400.

TABLE 3

| Process Block | Field | | | | | |
|---|---|---|---|---|---|---|
| | LBA | Current PBA | Prior PBA | gwc | tsn | hmd |
| 441 | — | — | — | — | — | — |
| 442 | m | NULL | g | 0 | tn | 0, n |
| 444 | m | f | g | 0 | tn | 0, n |
| 405 | | | Barrier sync | | | |
| 446 | m | f | g | 1 | tn | 0, n |
| 448 | — | — | — | — | — | — |

As shown in Tables 2-3 provided above, the order of steps performed by data unit 0 are only synchronized with the order of steps performed by parity unit 3 via a barrier sync operation in process block 405. With the exception of this particular point in time, a state of data unit 0 is arbitrary relative to a state of parity unit 3 at other points in time.

As shown in Table 2, prior version mapping information on data unit 0 during process blocks 421 and 428 does not include an entry for LBA n. As shown in Table 3, prior version mapping information on parity unit 3 during process blocks 441 and 448 does not include an entry for LBA m.

Table 4 below provides a list of different possible states of an affected unit, in one or more embodiments.

TABLE 4

| State | Description |
|---|---|
| 501 | There is no pending/outstanding write operation |
| 502 | Undo is possible |
| 503 | Completion of the original write operation is possible (redo) |
| 504 | Cleanup needed |
| 505 | Cleanup may be needed on one or more other affected units |
| — | State is invalid |

Table 5 below provides statr information indicative of states of data unit 0 and parity unit 3 during some process 400, in one or more embodiments.

|  |  | Data Unit 0 | | | | | |
|---|---|---|---|---|---|---|---|
|  |  | 421 | 422 | 424 | 405 | 426 | 428 |
| Parity Unit 3 | 441 | 501 | 502 | 503 |  | 505 | 501 |
|  | 442 | 502 | 502 | 503 |  | — | — |
|  | 444 | 502 | 502 | 503 |  | — | — |
|  | 405 |  |  |  |  |  |  |
|  | 446 | 505 | — | — |  | 504 | 505 |
|  | 448 | 501 | — | — |  | 505 | 501 |

As shown in Table 5 provided above, an overall state of the storage system 100 (i.e., state of data unit 0 and parity unit 3) is 503 (i.e., completion of the original write operation is possible (redo)) when data unit 0 and parity unit 3 are performing steps of process blocks 424 and 441, respectively.

On recovery from a power loss event, the storage system 100 needs to determine a state of each LBA. In one embodiment, to restore the storage system 100 after a power loss event, a state of each LBA corresponding to each affected unit may be determined based on state information and prior version mapping information, such as the prior version mapping information included in Tables 2-3 and the state information included in Table 5. For example, if the prior version mapping information on data unit 0 does not include an entry for LBA n and the prior version mapping information on parity unit 3 does not include an entry for LBA m (i.e., data unit 0 is either performing steps of process blocks 421 or 428 and parity unit 3 is either performing steps of process blocks 441 or 448), then an overall state of the storage system 100 (i.e., state of data unit 0 and state of parity unit 3) is 501 (i.e., there is no pending/outstanding write operation).

If an overall state of the storage system 100 (i.e., state of data unit 0 and state of parity unit 3) is 502 (i.e., undo is possible), the prior version mapping information on data unit 0 and the prior version mapping information on parity unit 3 includes a prior version copy but not a current version copy. In this state, a write operation may be undone to a state in which there is a consistent parity stripe by restoring a prior version copy for a LBA to a current version copy for the LBA. In one embodiment, the prior version copy for the LBA may be restored by removing an entry corresponding to the LBA from the prior version mapping information. A host system 60 may re-try a write command if the host system 60 does not receive a host write complete notification from the controller/virtualization unit 140 after issuing the write command.

If an overall state of the storage system 100 (i.e., state of data unit 0 and state of parity unit 3) is 503 (i.e., completion of the original write operation is possible), the prior version mapping information on data unit 0 and the prior version mapping information on parity unit 3 includes both a prior version copy for a LBA and a current version copy for the LBA. In this state, a write command may be completed by re-computing a new parity block.

If an overall state of the storage system 100 (i.e., state of data unit 0 and state of parity unit 3) is 504 (i.e., cleanup is needed), the storage system 100 contains a consistent parity stripe, thereby keeping the erasure code implemented by the storage system 100 intact. In this state, only a cleanup is required to remove associated entries from prior version mapping information. Each affected unit may return a global write complete notification to storage system 100.

If an overall state of the storage system 100 (i.e., state of data unit 0 and state of parity unit 3) is 505 (i.e., cleanup may be needed on one or more other affected units), some, but not all, affected units have completed cleanup. Cleanup is required on each affected unit with a pending free command.

In one embodiment, each framework 50, 51 and 52 provides one or more new I/O interfaces to facilitate processing and management of prior version mapping information. For example, the one or more new I/O interfaces may include a set of commands for implementing and managing the host aware update write protocol illustrated in FIG. 3. Table 6 below provides an example implementation of the set of commands, in one or more embodiments.

TABLE 6

| Command | Description |
|---|---|
| write(startLBA, LBAcount, data, update, tsn, hmd) | Performs a write operation on a set of LBAs.<br>startLBA is a starting LBA for the write operation.<br>LBAcount is a number of contiguous LBAs.<br>data is a volatile buffer holding new data to be written to the set of LBAs.<br>update is a flag indicating that the write operation is an update write operation.<br>tsn is a transaction sequence number if the write operation is an update write operation.<br>hmd is host-defined metadata that is stored if the write operation is an update write operation, and indicates the set of LBAs and data units involved in the update write operation.<br>In another embodiment, two separate write commands may be utilized instead: (1) a write(startLBA, LBAcount, data), and (2) update_write(startLBA, LBAcount, data, tsn, hmd). |

TABLE 6-continued

| Command | Description |
|---|---|
| read(startLBA, LBAcount, data, version, tsn, hmd) | Performs a read operation on a set of LBAs.<br>startLBA is a starting LBA for the read operation.<br>LBAcount is a number of contiguous LBAs.<br>data is a volatile buffer for holding data read on the set of LBAs.<br>version indicate a version copy to read. For example, if version is 0, a current version copy (i.e., most recent version copy) is read.<br>tsn is a transaction sequence number that is returned if a prior version copy is read.<br>hmd is host-defined metadata that is returned and held in a volatile buffer if a prior version copy is read. |
| global_wcomp(startLBA, LBAcount, tsn) | Sets a global write complete flag in prior version mapping information on an affected unit involved in an outstanding update write operation.<br>startLBA is a starting LBA for the update write operation.<br>LBAcount is a number of contiguous LBAs.<br>tsn is a transaction sequence number for the update write operation. |
| free_vmap(startLBA, LBAcount, tsn) | Removes an entry included in prior version mapping information on an affected unit involved in an update write operation and marks a PBA containing a prior version copy as free.<br>startLBA is a starting LBA for the update write operation.<br>LBAcount is a number of contiguous LBAs.<br>tsn is a transaction sequence number for the update write operation. |
| clear_vmap( ) | Clears entire prior version mapping information on a storage unit. This command is useful for format operations. |
| read_vmap_entry(startLBA, tsn, buf) | Returns an entry included in prior version mapping information on an affected unit involved in an update write operation.<br>startLBA is a starting LBA for the update write operation.<br>tsn is a transaction sequence number for the update write operation.<br>buf is a volatile buffer for holding the entry returned. |
| read_vmap(buf, szbuf) | Returns prior version mapping information on a storage unit. The prior version mapping information returned may be used in reconstruction during data recovery from a power loss event.<br>buf is a volatile buffer for holding the prior version mapping information returned.<br>szbuf is a size of buf. |
| provision_vmap(naddresses) | Sets a size of prior version mapping information on a storage unit.<br>naddresses is a number of PBAs assigned to prior version copies. |
| inquiry(. . .) | A set of different inquiry commands to determine aspects of an implementation, such as support, maximum provision size, parameters, etc. |

For example, in the framework 50, the set of commands are implemented by the controller/virtualization unit 140 and the one or more storage units 120. As another example, in the framework 51, the set of commands are implemented by the controller/virtualization unit 140 and the one or more storage units 120 via the I/O units 61 and 130, respectively. As yet another example, in the framework 52, the set of commands are implemented by the controller/virtualization unit 140 and the one or more storage units 120 via the I/O units 82 and 130, respectively.

Each framework 50, 51 and 52 is applicable to any situation where update write operations need to be atomic across disparate storage units, including file systems, databases, etc.

Figure 4:
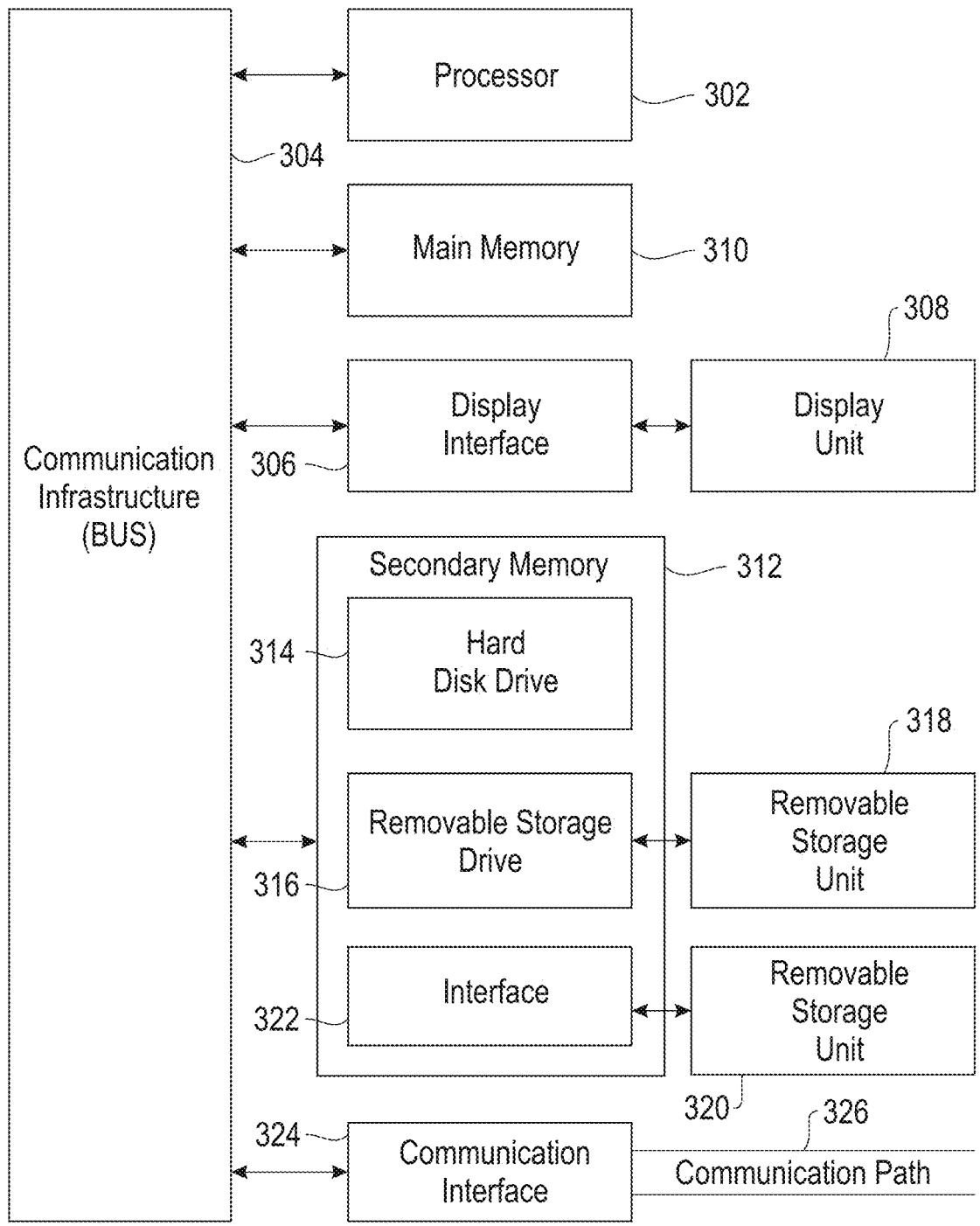
FIG. 4 is a high level block diagram showing an information processing system useful for implementing an embodiment of the present invention.

FIG. 4 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
maintaining, on a storage unit, mapping data among a first set of logical addresses viewed by a host and a first set of physical addresses and a second set of physical addresses of the storage unit, wherein a first logical address of the first set of logical addresses corresponds to a first physical address of the first set of physical addresses that maintains current data for the first logical address, the first logical address further corresponds to a second physical address of the second set of physical addresses that maintains prior data for the first logical address, the mapping data is included in extended mapping metadata for a logical block address, the extended mapping data being maintained in an internal translation layer of the storage unit, the storage unit comprises a plurality of data units and a plurality of parity units, and the storage unit implements a parity erasure code; and
receiving, at the storage unit, a write command, issued in parallel to a data unit of the plurality of data units and a parity unit of the plurality of parity units based on an update write flag, from the host to perform a multi-device operation involving the first logical address, wherein the operation uses a host aware update write protocol that keeps the parity erasure code intact, the operation is performed atomically, and the write command uses a plurality of parameters that includes the update write flag that indicates whether the write command is an update write operation.

2. The method of claim 1, wherein the current data comprises a current data block, and the prior data comprises a prior data block.

3. The method of claim 1, wherein the current data comprises a current parity block, and the prior data comprises a prior parity block.

4. The method of claim 1, wherein the extended mapping metadata comprises a first field for a logical address as seen by the host and a second field that includes a prior version copy of data for the logical block address, the plurality of parameters further includes a transaction sequence number, and the internal translation layer implements a first function for determining a physical block addresses of the storage unit associated with a logical block address, and a second function for retrieving a free physical block address of the storage unit for write operations.

5. The method of claim 4, wherein the extended mapping metadata for the first logical address identifies and tracks one or more prior version copies for the first logical address, the extended mapping metadata for the first logical address comprises, for each prior version copy for the first logical address, a corresponding physical address maintaining the prior version copy, and the storage unit comprises a copy-on-write (COW) storage unit.

6. The method of claim 4, wherein the extended mapping metadata includes a fourth field for a host-defined metadata indicative of each storage unit involved in the update write operation.

7. The method of claim 4, wherein the extended mapping metadata includes a third field for a transaction sequence number for the update write operation, and the plurality of parameters further includes a transaction record that comprises a list of each affected data unit requiring an update write to successfully complete a write command and each logical block address that corresponds to each affected data unit.

8. The method of claim 7, wherein the operation is complete in response to the host receiving from the storage unit the following notifications that indicate multi-device atomicity: a notification confirming that an update write on the storage unit is complete, a notification confirming that a global write complete flag is set, and a notification confirming that an entry in the extended mapping metadata that corresponds to the first logical address and includes the transaction sequence number is removed from the extended mapping metadata.

9. A system comprising:
a memory that stores instructions; and
at least one processor configured to execute the instructions to:
maintain, on a storage unit, mapping data among a first set of logical addresses viewed by a host and a first set of physical addresses and a second set of physical addresses of the storage unit, wherein a first logical address of the first set of logical addresses corresponds to a first physical address of the first set of physical addresses that maintains current data for the first logical address, the first logical address further corresponds to a second physical address of the second set of physical addresses that maintains prior data for the first logical address, the mapping data is included in extended mapping metadata for a logical block address, the extended mapping data being maintained in an internal translation layer of the storage unit, the storage unit comprises a plurality of data units and a plurality of parity units, and the storage unit implements a parity erasure code; and receive, at the storage unit, a write command, issued in parallel to a data unit of the plurality of data units and a parity unit of the plurality of parity units based on an update write flag, from the host to perform a multi-device operation involving the first logical address, wherein the operation uses a host aware update write protocol that keeps the parity erasure code intact, the operation is performed atomically, and the write command uses a plurality of parameters that includes the update write flag that indicates whether the write command is an update write operation.

10. The system of claim 9, wherein the current data comprises a current data block, and the prior data comprises a prior data block.

11. The system of claim 9, wherein the current data comprises a current parity block, and the prior data comprises a prior parity block.

12. The system of claim 9, wherein the extended mapping metadata comprises a first field for a logical address as seen by the host and a second field that includes a prior version copy of data for the logical block address, the plurality of parameters further includes a transaction sequence number, and the internal translation layer implements a first function for determining a physical block addresses of the storage unit associated with a logical block address, and a second function for retrieving a free physical block address of the storage unit for write operations.

13. The system of claim 12, wherein the extended mapping metadata for the first logical address identifies and tracks one or more prior version copies for the first logical address, the extended mapping metadata for the first logical address comprises, for each prior version copy for the first logical address, a corresponding physical address maintaining the prior version copy, and the storage unit comprises a copy-on-write (COW) storage unit.

14. The system of claim 12, wherein the extended mapping metadata includes a fourth field for a host-defined metadata indicative of each storage unit involved in the update write operation.

15. The system of claim 12, wherein the extended mapping metadata includes a third field for a transaction sequence number for the update write operation, and the plurality of parameters further includes a transaction record that comprises a list of each affected data unit requiring an update write to successfully complete a write command and each logical block address that corresponds to each affected data unit.

16. The system of claim 15, wherein the operation is complete in response to the host receiving from the storage unit the following notifications that indicate multi-device atomicity: a notification confirming that an update write on the storage unit is complete, a notification confirming that a global write complete flag is set, and a notification confirming that an entry in the extended mapping metadata that corresponds to the first logical address and includes the transaction sequence number is removed from the extended mapping metadata.

17. A computer program product for a host aware update write protocol, the computer program product comprising a computer-readable hardware storage medium having program instructions embodied therewith, the program instructions executable by a processor to cause the processor to:

maintain, by the processor, on a storage unit, mapping data among a first set of logical addresses viewed by a host and a first set of physical addresses and a second set of physical addresses of the storage unit, wherein a first logical address of the first set of logical addresses corresponds to a first physical address of the first set of physical addresses that maintains current data for the first logical address, the first logical address further corresponds to a second physical address of the second set of physical addresses that maintains prior data for the first logical address, the mapping data is included in extended mapping metadata for a logical block address, the extended mapping data being maintained in an internal translation layer of the storage unit, the storage unit comprises a plurality of data units and a plurality of parity units, and the storage unit implements a parity erasure code; and receive, by the processor, at the storage unit, a write command, issued in parallel to a data unit of the plurality of data units and a parity unit of the plurality of parity units based on an update write flag, from the host to perform a multi-device operation involving the first logical address, wherein the operation uses a host aware update write protocol that keeps the parity erasure code intact, the operation is performed atomically, and the write command uses a plurality of parameters that includes the update write flag that indicates whether the write command is an update write operation.

18. The computer program product of claim 17, wherein the extended mapping metadata comprises a first field for a logical address as seen by the host and a second field that includes a prior version copy of data for the logical block address, the plurality of parameters further includes a transaction sequence number, and the internal translation layer implements a first function for determining a physical block addresses of the storage unit associated with a logical block address, and a second function for retrieving a free physical block address of the storage unit for write operations.

19. The computer program product of claim 18, wherein the extended mapping metadata for the first logical address identifies and tracks one or more prior version copies for the first logical address, the extended mapping metadata for the first logical address comprises, for each prior version copy for the first logical address, a corresponding physical address maintaining the prior version copy, and the storage unit comprises a copy-on-write (COW) storage unit.

20. The computer program product of claim 18, wherein the extended mapping metadata includes a third field for a transaction sequence number for the update write operation, and the plurality of parameters further includes a transaction record that comprises a list of each affected data unit requiring an update write to successfully complete a write command and each logical block address that corresponds to each affected data unit.

* * * * *